United States Patent [19]

Eisemann

[11] Patent Number: 4,562,566
[45] Date of Patent: Dec. 31, 1985

[54] DISC PLAYER

[75] Inventor: Kurt Eisemann, Berlin, Fed. Rep. of Germany

[73] Assignee: U.S. Philips Corporation, New York, N.Y.

[21] Appl. No.: 479,306

[22] Filed: Mar. 28, 1983

[30] Foreign Application Priority Data

Mar. 27, 1982 [DE] Fed. Rep. of Germany ....... 3211358

[51] Int. Cl.[4] ...................... G11B 17/04; G11B 19/16
[52] U.S. Cl. .................................................. 369/75.2
[58] Field of Search ................... 369/75.1, 75.2, 77.2, 369/270, 291, 292

[56] References Cited

U.S. PATENT DOCUMENTS

| 3,223,422 | 12/1965 | Ernst | 369/75.2 |
| 4,098,511 | 7/1978 | Leedom | 369/77.1 |
| 4,416,003 | 11/1983 | Suzuki | 369/75.2 |
| 4,439,850 | 3/1984 | Takahara et al. | 369/77.2 |
| 4,498,161 | 2/1985 | Eisemann | 369/75.2 |
| 4,509,157 | 4/1985 | Morinaga | 369/75.2 |

FOREIGN PATENT DOCUMENTS

| 234753 | 2/1960 | Australia | 369/77.1 |
| 76583 | 4/1983 | European Pat. Off. | 369/77.1 |

Primary Examiner—Steven L. Stephan
Attorney, Agent, or Firm—David R. Treacy

[57] ABSTRACT

In a disc player, such as for a rigid disc, a compartment slides on the inside of the lid between an outer position in which a disc may easily be inserted or removed, and a position in which, when the lid is closed, the disc is on a turntable. A lever, pivotally connected to the chassis and a sliding compartment in the lid, and an arm extending from the lid, are interconnected by a spring whose biasing force holds the lid in the open position.

2 Claims, 1 Drawing Figure

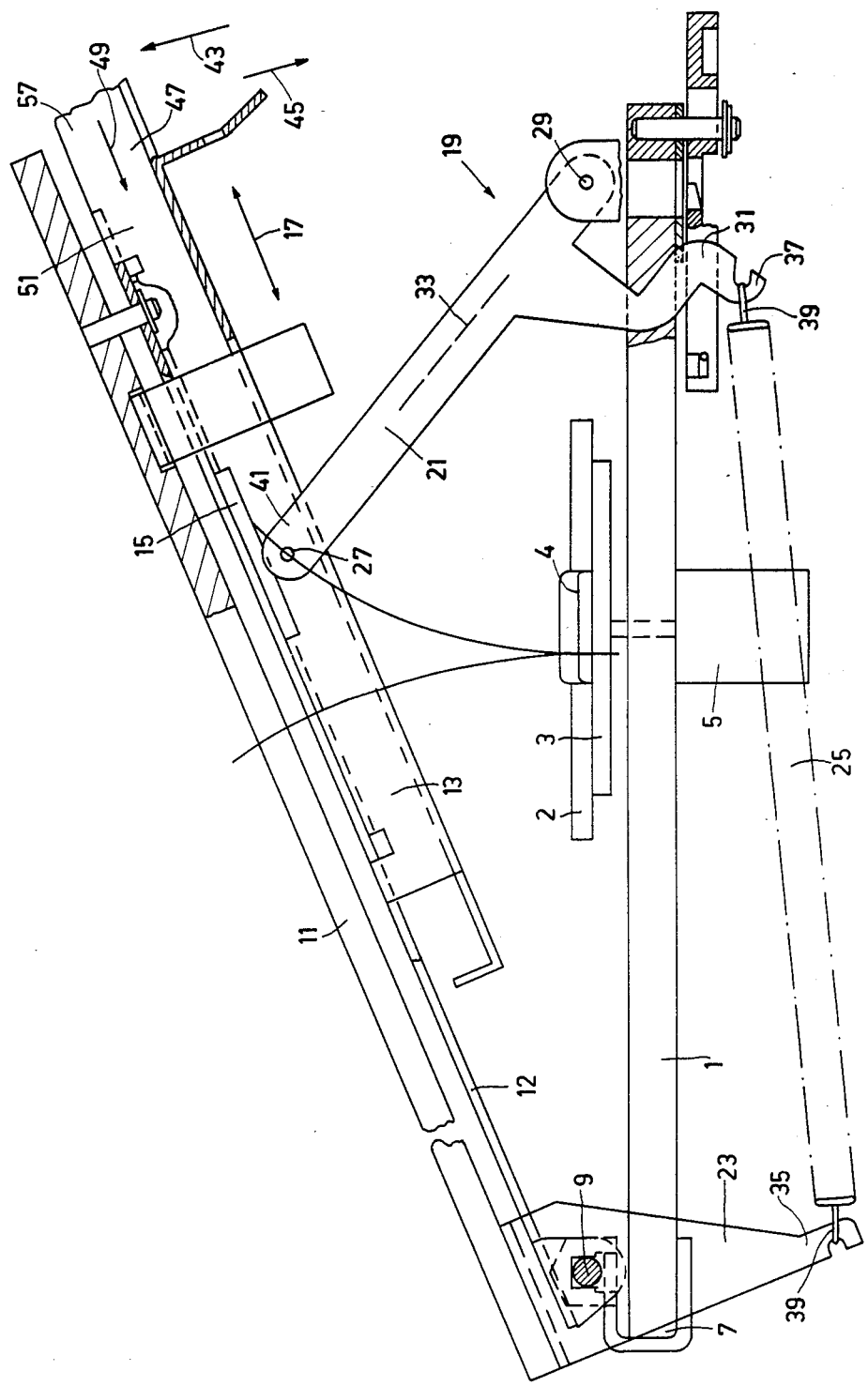

DISC PLAYER

The invention relates to a disc player for a rigid information-carrying disc, which player comprises a turntable which is rotatably journalled relative to a chassis and which can be closed by means of a lid which is pivotally connected to the chassis, which comprises a compartment for receiving the disc between the lid and a slide which is connected thereto, which slide is connected to be movable relative to the lid in such a way that when the lid is opened the slide moves the disc out of the compartment and when the lid is closed brings the disc in the loading position above the turntable.

German Offenlegungsschrift No. 29 21 410 describes a disc player for playing back a rigid information-carrying disc placed on a turntable. The lid of the player carriers a disc loader, which resiliently acts on the information-carrying disc by means of a magnetic ring. When the lid of the player is closed the disc loader acts on the disc and thereby urges it onto the turntable.

The lid is lowered onto the player and is pivotable relative to the chassis of the player about a pivoting spindle arranged on the rear. In this player the lid is opened so far that the rigid information-carrying disc can be placed on the turntable by hand. The loading and unloading process requires manual centering of the information-carrying disc on the turntable in such a way that after closure of the lid it occupies the desired position. In the case of discs of a comparatively large diameter this is readily possible. In the case of discs of a smaller diameter, which can be changed in a faster and simpler manner, this is inconvenient.

From German Patent Specification No. 1,499,804 a player is known in which a slide for receiving an information carrier is moved slightly relative to the lid when this is opened, so that the information carrier is also moved. This movement over a comparatively short distance is too small to allow a disc of small diameter to be exchanged in a convenient manner.

It is the object of the invention to provide a disc player of the type mentioned in the foregoing, in which the information-carrying disc can be exchanged with one hand only.

According to the invention this is achieved in that a lever which is pivotally connected to the chassis pivotally co-operates with the slide, obliquely relative to the pivotal position of the lid, a projecting arm is arranged on the lid near the hinge of the lid, and a spring connects the free end of the arm to an extension member of the lever.

In this way a simple extension system is obtained which moves the slide depending on the pivotal position of the lid and simultaneously with the lid. When the lid is fully swung open, the disc with the slide has moved to an outer position so far relative to the edge of the lid that the disc can readily be removed. Moreover, the lid and the slide are in a stable position when the lid is opened.

Embodiments of the invention will now be described in more detail, by way of example, with reference to the drawing.

The drawing sole FIGURE is shows a side, part sectional view of a part of a disc player in accordance with the invention.

A turntable 3 and a disc-centering device 4, shown schematically, are mounted for rotation on the chassis 1 of a disc player for playing back a rigid information-carrying disc 2. The turntable 3 can be driven by means of a drive motor 5. Near a side 7 of the chassis 1 a lid 11 is pivotally connected to the chassis by means of a hinge 9. The lid 11 is pivotable about the hinge 9 axis between the open position, shown in the drawing, and a closed position substantially parallel to the turntable 3.

A slide 13 is arranged to be slidable on a carrier plate 12 which pivots with the cover 11 about the hinge 9. The slide is guided by rails 15 arranged on the carrier plate 12. The slide 13 is movable relative to the lid 11 in the directions indicated by the double arrow 17.

For the movement of the slide 13 there are provided two lever devices 19, one on each side of the chassis 1. Each device 19 comprises a lever 21 and a projecting arm 23, which are interconnected by a tension spring 25 underneath the chassis 1. The lever 21 is pivotally connected to the slide 13 by a pivot 27 and to the chassis 1 by means of another pivot 29. In the open position of the lid the lever 21 is in an oblique position which is inverted relative to the oblique position of the lid 11. The lever 21 comprises an extension member 31 which extends to a point underneath the chassis 1 perpendicularly to an axis 33 between the locations of the pivots 27 and 29 of the lever 21.

Near the pivot 9 the arm 23 is rigidly connected to the lid 11 and extends from the lid to a point underneath the chassis 1. Free ends 35 and 37 of the arm 23 and the extension member 31 respectively are both situated underneath an imaginary line connecting the pivots 9 and 29. The tension spring 25 is connected to the free ends 35 and 37 by lugs 39.

Each lever device 19 is constructed so that via the pivot 27 an end portion 41 of an arm of the lever 21 moves the slide 14 in the direction indicated by the right-hand arrow 19 in FIG. 1 when the lid is pivoted away from the turntable 3 in the direction of an arrow 43. When the lid is closed in the direction of an arrow 45 the slide 13 is moved in the opposite direction. A guide near side walls 47 of the slide 13 is constructed so that an information-carrying disc 2, which is inserted in the direction of an arrow 49 into a compartment 51 between the carrier plate 12 and the slide 13, accurately engages the centering device 4 of the turntable 3 with its central hole when the lid 11 is closed in the direction of the arrow 45. The information-carrying disc 2 can be removed through a slot 57 in the compartment 51 when the lid 11 is in the swung-open position shown in the drawing. By the choice and the arrangement of the lever 21, the arm 23 and the spring 25 relative to each other, the disc 2 is in such an advanced position relative to the front edge of the lid 11 that the disc can be exchanged in a convenient manner in the swung-open position. In this respect it is also of advantage that in this position the lid 11 remains positioned correctly.

What is claimed is:

1. A disc player for an information-carrying disc inserted into the player, comprising
a chassis,
a turntable rotatably journalled to the chassis,
a lid, having a projecting arm extending therefrom,
a hinge pivotally connecting the lid to the chassis for pivotable movement of the lid between first and second positions about a hinge axis located near said arm,
a slide, mounted to the lid for slidable movement away from and toward the hinge between a loading position and an outer position in which the slide is farther from the hinge axis, said slide at least partly bounding a compartment arranged for receiving a disc, in said outer position said compartment extending beyond said lid such that the disc can be readily removed, means for moving the slide from the loading position to the outer position as the lid is pivoted from the first position to the second position, said means including a lever having an arm with an end portion and having an extension member, said lever being pivotably connected to the chassis at a pivot location remote from said hinge axis; and means pivotably connecting said arm end portion to said slide, arranged such that, when the lid is in the first position, the arm extends from said pivot location toward the hinge axis, and as the lid pivots from the first to the second position, the lever pivots with respect to the chassis, and said slide and lever arm end portion move away from the hinge axis, and a spring connected between said projecting arm and said extension member so as to bias the lid in the direction of pivoting from the first to the second position, in said first position of the lid said compartment being so disposed that a disc received therein is adjacent said turntable.

2. A player as claimed in claim 1, characterized in that said lever arm and lever extension member extend generally perpendicular to each other from the pivot location; said lid arm extends in a direction from the hinge axis away from the lid; and said lever and lid arm are so arranged that, at least when the lid is in the first position, the chassis, the hinge axis and the pivot axis are all between said spring and said lid.

* * * * *